(12) United States Patent
Schick

(10) Patent No.: US 12,382,189 B2
(45) Date of Patent: Aug. 5, 2025

(54) OPTICAL ASSEMBLY FOR GENERATING A REAL-TIME IMAGE AND A REAL-TIME ASSIGNMENT OF ENVIRONMENTAL OBJECTS, AND VEHICLE COMPRISING SUCH AN ASSEMBLY

(71) Applicant: Tripleye GmbH, Karlsruhe (DE)

(72) Inventor: Jens Schick, Herrenberg (DE)

(73) Assignee: Tripleye GmbH, Karlsruhe (DE)

( * ) Notice: Subject to any disclaimer, the term of this patent is extended or adjusted under 35 U.S.C. 154(b) by 173 days.

(21) Appl. No.: 18/278,174

(22) PCT Filed: Feb. 22, 2022

(86) PCT No.: PCT/EP2022/054305
§ 371 (c)(1),
(2) Date: Aug. 21, 2023

(87) PCT Pub. No.: WO2022/179998
PCT Pub. Date: Sep. 1, 2022

(65) Prior Publication Data
US 2024/0147084 A1  May 2, 2024

(30) Foreign Application Priority Data
Feb. 23, 2021 (DE) ............... 10 2021 201 678.2

(51) Int. Cl.
*H04N 23/90* (2023.01)
*H04N 23/11* (2023.01)
(Continued)

(52) U.S. Cl.
CPC ............ *H04N 23/90* (2023.01); *H04N 23/11* (2023.01); *H04N 23/13* (2023.01); *H04N 23/698* (2023.01)

(58) Field of Classification Search
CPC ........ H04N 23/90; H04N 23/11; H04N 23/13; H04N 23/698; B60R 1/27; B60R 2011/004; B60R 2300/607; B60R 11/04
See application file for complete search history.

(56) References Cited

U.S. PATENT DOCUMENTS

| | | | |
|---|---|---|---|
| 2007/0204684 A1* | 9/2007 | Muhlhoff | G01B 11/165 73/146 |
| 2010/0134634 A1* | 6/2010 | Witt | H04N 5/2224 348/181 |

(Continued)

FOREIGN PATENT DOCUMENTS

| | | |
|---|---|---|
| DE | 102017115810 A1 | 1/2019 |
| DE | 102018132676 A1 | 6/2020 |

(Continued)

*Primary Examiner* — Hung H Lam
(74) *Attorney, Agent, or Firm* — Smartpat PLC

(57) ABSTRACT

An optical assembly is used to generate a real-time image and a real-time assignment of environmental objects. The optical assembly has a plurality of camera groups which each have cameras interconnected via a camera signal connection, the entrance pupil centers of which cameras define a camera arrangement plane in which the cameras are arranged. The camera groups are in turn interconnected via a group signal connection. Adjacent image capture directions of the cameras of one of the camera groups assume an individual camera angle with respect to one another which is in the range between 5° and 25°. A direction mean value of the image capture directions of the cameras of one of the camera groups assumes a group-camera angle with respect to a direction angle value of the image capture directions of the cameras of an adjacent camera group, which is in the range between 30° and 100°. This results in an optical assembly with improved reliability of a real-time detection of environmental objects and improved real-time assign- (Continued)

ment, and which is well adapted to the practice, in particular of image capture to allow autonomous driving.

15 Claims, 10 Drawing Sheets

(51) Int. Cl.
*H04N 23/13* (2023.01)
*H04N 23/698* (2023.01)

(56) References Cited

U.S. PATENT DOCUMENTS

| | | | |
|---|---|---|---|
| 2012/0154604 A1* | 6/2012 | Chen | G06T 7/80 |
| | | | 348/E17.002 |
| 2016/0301863 A1 | 10/2016 | Petrany et al. | |
| 2018/0316912 A1* | 11/2018 | Wakai | H04N 13/239 |
| 2019/0082114 A1 | 3/2019 | Jeon | |
| 2019/0139261 A1* | 5/2019 | Wakai | H04N 13/239 |
| 2019/0364206 A1 | 11/2019 | Mutto et al. | |
| 2023/0377196 A1* | 11/2023 | Schick | H04N 13/128 |
| 2025/0047983 A1* | 2/2025 | Dal Mutto | H04N 23/90 |

FOREIGN PATENT DOCUMENTS

| | | | | |
|---|---|---|---|---|
| WO | 2013020872 A1 | | 2/2013 | |
| WO | WO-2020184940 A1 | * | 9/2020 | A47G 23/08 |
| WO | WO-2024056936 A1 | * | 3/2024 | B27L 1/00 |

* cited by examiner

OPTICAL ASSEMBLY FOR GENERATING A REAL-TIME IMAGE AND A REAL-TIME ASSIGNMENT OF ENVIRONMENTAL OBJECTS, AND VEHICLE COMPRISING SUCH AN ASSEMBLY

CROSS-REFERENCES TO RELATED APPLICATIONS

This application claims the priority of German Patent Application, Serial No. DE 10 2021 201 678.2, filed Feb. 23, 2021, the content of which is incorporated herein by reference in its entirety as if fully set forth herein.

FIELD OF THE INVENTION

The invention relates to an optical assembly for generating a real-time image and a real-time assignment of environmental objects. The invention further relates to a vehicle comprising such an optical assembly.

BACKGROUND OF THE INVENTION

An optical assembly of the type mentioned above and a vehicle equipped therewith is known from WO 2013/020872 A1. DE 10 2017 115 810 A1 discloses a method for autonomously parking a vehicle and a driving assistance system for carrying out the method. US 2016/0301863 A1 discloses an image processing system for generating a surround view image. DE 10 2018 132 676 A1 discloses a method for localizing a vehicle in an environment and a corresponding driving assistance system.

SUMMARY OF THE INVENTION

It is an object of the present invention to further embody an optical assembly of the type mentioned above in such a manner that the safety of a real-time detection of environmental objects, in particular of an environmental scene, and their real-time assignment is improved and well adapted to the practice, in particular of image capture to ensure autonomous driving.

This object is achieved according to the invention by an optical assembly for generating a real-time image and a real-time assignment of environment objects, having a plurality of camera groups, which each have at least two cameras interconnected via a camera signal connection, the entrance pupil centers of which cameras define a camera arrangement plane in which the cameras are arranged, wherein the camera groups are in turn interconnected via a group signal connection, wherein adjacent image capture directions of the cameras of one of the camera groups assume an individual camera angle with respect to one another which is in the range between 5° and 25°, wherein a direction mean value of the image capture directions of the cameras of one of the camera groups assumes a group-camera angle, with respect to a direction mean value of the image capture directions of the cameras of an adjacent camera group, which is in the range between 30° and 100°.

According to the invention, it has been recognized that the provision of multiple camera groups, each with at least two and in particular at least three signal-linked cameras, significantly improves the possibility of real-time imaging and real-time assignment of environmental objects, in particular for the preparation of autonomous driving. The assignment ensures that different cameras within one of the camera groups and/or different cameras of different camera groups actually image the same object and/or the same object signature. If exactly two cameras are used within a camera group, triangulation used for real-time assignment can be carried out with the help of two camera groups, for example, by linking the acquisition data of the two cameras of one of the camera groups with the acquisition data of a camera of the second camera group and evaluating them during triangulation.

Positional deviations between signatures of scenery objects resulting from positional deviations between cameras can be precisely detected and compensated for with the help of a spatial image capture method using this optical assembly. The image capture direction can be an optical axis of the respective camera.

A group camera angle between direction mean values of the image capture directions of adjacent camera groups between 30° and 100° enables good environmental coverage with the optical assembly using the smallest possible number of camera groups. In particular, this reduces the effort required for signal processing of the camera signals. The cameras of the camera groups can have a large aperture or image angle. A horizontal aperture angle of the respective camera can be up to 180° and can also be even larger. The aperture angle of the camera can be smaller than 175°, can be smaller than 160° and can also be smaller than 140°. As a rule, the horizontal aperture angle is greater than 90°. A vertical aperture angle of the respective camera can be greater than 90°. This vertical aperture angle is regularly smaller than 180°: The respective camera is regularly aligned such that its optical axis assumes an angle with a horizontal plane which corresponds to half the vertical aperture angle. The cameras of the camera groups can be designed as fisheye cameras.

The single camera angle between the image capture directions of the cameras of exactly one of the camera groups can be in the range between 10° and 20° and can in particular be in the range of 15°. This ensures a good spatial allocation of scenery objects, in particular in a close range around the respective camera group. A respective single camera angle range can apply to the single camera angles of adjacent image capture directions of all cameras of a respective camera group as well as for all cameras of all camera groups in each case, so that the single camera angle range operation can be fulfilled for all cameras of one of the camera groups and/or for all cameras of all camera groups.

The group camera angle can be in the range between 45° and 75° and can in particular be in the range of 60°. A large group camera angle can be used in particular when using fisheye cameras. The group camera angle condition can be fulfilled for all camera groups of the optical assembly that are adjacent to each other.

If more than three cameras, for example four cameras, belong to a camera group, three of these four cameras of the camera group can define the camera arrangement plane of the respective camera group and the fourth camera of the same camera group can be arranged outside this arrangement plane.

The optical assembly has signal processing components that ensure real-time imaging and real-time assignment of the environmental objects. For this purpose, the optical assembly includes correspondingly powerful data processing module systems, in particular real-time capable processors and real-time capable signal connections. A latency time of the optical assembly may be 200 ms and may be smaller, for example 150 ms, 100 ms or 50 ms. A frame rate of the optical assembly may be 10 (10 fps, frames per second). A higher frame rate, for example 15, 20, 25 or even higher, can also be realized.

An arrangement of the cameras of one of the camera groups whose individual pupil centers are located in the corners of a non-equilateral triangle has proven itself in practice, since undesired resonance effects in the imaging and/or undesired misassignments, i.e. an incorrect assignment in particular of object signatures, which actually belong to different objects, to the same object, are avoided. The triangle in whose corners the entrance pupil centers are located can have two or three different side lengths.

A baseline length range between the entrance pupil centers of two cameras of a camera group in the range of 5 cm to 30 cm enables good capture of a close range of the respective camera group from a lower limit of, for example, 30 cm or 50 cm. Objects that are closely adjacent to the camera groups can then also be reliably detected and assigned.

As a rule, objects can be reliably detected and assigned at a distance that is at least three times the baseline length. With a baseline length of 10 cm, for example, the minimum object distance for objects to be reliably detected and assigned is 30 cm.

For a given baseline length, a ratio between a maximum detectable and assignable object distance and a minimum detectable and assignable object distance is typically a factor of 20. If the minimum detectable and assignable object distance is 30 cm, this results in a maximum detectable and assignable object distance of 6 m.

The length of the baseline between the entrance pupil centers of two cameras in a camera group may also be in the range between 10 cm and 20 cm or in the range between 10 and 15 cm. The length of the baseline of all camera pairs which are present in the respective camera group can be in such a range.

A baseline length between the cameras of different and in particular adjacent camera groups in the range of 0.5 m to 3 m enables a safe coverage of an average distance range, the lower limit of which can overlap with an upper limit of the close range that can be covered by an individual camera group. The baseline length between cameras of different camera groups may be in the range between 1 m and 2 m. The length of the baselines between cameras of all adjacent camera groups of the optical assembly may be in such a range. The baseline length between cameras of different camera groups can be selected in dependence on the baseline length between the cameras of one and the same camera group such that the object distance ranges for reliable detection and assignment of objects adjoin or overlap each other on the one hand via precisely one of the camera groups and on the other hand via cameras of different camera groups. With an exemplary baseline length between the cameras of precisely one of the camera groups of 10 cm and a resulting maximum reliably detectable and assignable object distance of 6 m, the length of the baseline between cameras of different camera groups can be 2 m, for example, which leads to a minimum reliably detectable and assignable object distance for the cameras of different camera groups of 6 m in turn. In this case, the distance ranges of the reliably detectable and assignable object detection of the respective camera groups (Intra) and the different camera groups (Inter) therefore adjoin each other.

Thus, one of the camera groups can be used in each case to cover an object close range and the interaction of at least two camera groups can be used to cover an object long range, wherein the close range and the long range can directly adjoin or overlap each other.

The numbers of at least three or at least six camera groups have proven to optimize a horizontal and/or a vertical total coverage of the optical assembly. In particular, a horizontal total coverage can be 360° so that the entire horizontal environment of the optical assembly is captured. A vertical total coverage can be 180° or larger depending on the objectives of the cameras used and can be, for example, 220° when fisheye cameras are used. When the optical assembly is implemented in a car, for example, a vertical total coverage of 100° can be used (vertically downwards to 10° above the horizontal). The horizontal and/or the vertical total coverage can be divided into several solid angle sections.

A group mounting body for mounting the cameras of a camera group, wherein the group mounting body is configured such as to support the cameras of the camera group with fixed relative position and orientation to each other, leads to an advantageous position and orientation stability of the cameras of the respective camera group.

A group mounting body which has prepared holding receptacles for mounting additional cameras, so that the camera group can be retrofitted to be extended by at least one further camera to be mounted, results in a camera group which can be adapted to the respective imaging and assignment requirements. For example, the group mounting body may have one prepared holding receptacle, two prepared receptacles, or more than two prepared holding receptacles for mounting additional cameras. The respective holding receptacle can be designed to be complementary to a correspondingly associated holder of a camera to be mounted.

The object mentioned at the beginning is also achieved by an optical assembly for generating a real-time image and a real-time assignment of environmental objects, having a plurality of cameras which are linked to one another via a camera signal connection and are designed as fisheye cameras.

A fisheye camera is a camera with a fisheye lens. An aperture or image angle of such a fisheye lens can be up to 310°. Usually, the image angle of a fisheye lens is at least 180° in the image diagonal. A focal length of the fisheye lens can be in the range of 4 mm to 20 mm A typical focal length is 4.5 mm or in the range between 8 and 10 mm. An imaging function of the fisheye lens may be true to angle, may be equidistant, may be true to area, or may be orthographic. The fisheye lens may also have a parametric imaging in the form of a non-fundamental imaging function.

The features of the optical assemblies explained above can also be combined with each other, depending on the embodiment.

By using fisheye cameras, the number of cameras required in the optical assembly to cover required solid angle sections or to cover a required horizontal and/or vertical total coverage can be advantageously small.

A dual camera with an RGB sensor and with an IR sensor extends the possibilities of the optical assembly. The dual camera can have separate but spatially closely adjacent camera optics for the RGB sensor on the one hand and for the IR sensor on the other hand A distance between the optical axes of the RGB camera optics on the one hand and the IR camera optics on the other hand may be smaller than 35 mm. The two sensors and/or the two camera optics of the dual camera may be mounted on a common carrier. A readout of image information of the dual camera can be stitched so that, for example, one line of the RGB sensor is read out followed by one line of the IR sensor. In addition to the IR sensor, an IR light source can also be used, with which in particular a textured IR illumination of the scene to be captured can be performed. The sensors with the different detection wavelength ranges enable improved accuracy in the detection and assignment of the environmental objects.

A hybrid camera with a close-range optics and with a long-range optics also leads to an extension of the possibilities of the optical assembly. The hybrid camera can cover an increased distance range, which ensures an increase in the safety of the optical assembly. The close-range optics may be configured as fisheye optics. The long-range optics can be configured as telephoto optics. The two optics of the hybrid camera may be mounted on a common carrier. The close-range optics may comprise a dual camera with an RGB sensor and with an IR sensor, in particular. Accordingly, the long-range optics may also comprise a dual camera with an RGB sensor and an IR sensor.

A data processing module system comprising at least one data processing unit for processing the camera data for real-time imaging and real-time assignment of the environmental objects, wherein the data processing module system comprises at least one data processing group module which is assigned to precisely one of the camera groups and processes the data thereof, and in each case has at least one data processing main module which is assigned to all the camera groups, ensures efficient real-time detection and real-time assignment of the environmental objects. The division of the data processing module system into group modules individually assigned to the camera groups in each case and into a main module assigned to all camera groups enables a processing organization which allows a very fast initial detection and assignment at the group module level, wherein a verification of selected aspects, in particular a verification of doubtful assignments at the group module level, can then still take place at the main module level. Between the data processing group modules, there may be a signal connection between different camera groups to enable real-time assignment on the basis of camera data from different camera groups at the group level. Inter-baseline evaluation can thus be performed at the group level. The main module may have a coprocessor or a monitoring processor to ensure correct operation of the main module. Serial data transfer can take place between the group modules according to the MIPI/CSI standard. If a hybrid camera is used, the close-range optics on the one hand and the long-range optics on the other hand can have a signal connection with their own data processing group module. More than one data processing group module can also be assigned to one and the same camera group. This is in particular the case if several different camera types are used within one camera group, for example at least two of the following three camera types: Single camera, dual camera, hybrid camera.

At least one redundancy component such as at least one additional redundancy camera as part of one of the camera groups and/or at least one redundancy data processing group module and/or at least one redundancy data processing main module increases the fail-safety of the optical assembly. Fail redundancy, functional redundancy and also form redundancy may be provided.

In the case of functional redundancy, there are several measuring systems with the same technology that measure the same thing. The redundancy component is then technically designed in the same way as a basic component. An example of this is an additional redundancy camera which is designed in exactly the same way as the originally intended cameras of one of the camera groups.

In the case of form redundancy, measuring systems with different technology measure the same thing. An example of such form redundancy is the detection of objects with the help of a camera that is sensitive to visible light, for example with an RGB camera, and with a camera that is sensitive to infrared light. The different measuring systems are used in particular for the imaging and the assignment of the imaged objects.

In the case of fail-safe redundancy, the detection of a contradiction between two measurements leads to signaling of a fault and to stopping a vehicle with which the optical assembly is equipped into a safe state.

In the case of fail-operational redundancy, the detection of a contradiction between at least three measurements with a vote for two equal measurements (majority decision) leads to a warning with continuation of a performed operation of the vehicle. Insofar as a component of the assembly fails, a replacement or redundancy component for the failed component must be available so that such a majority decision can continue to be made.

A camera group with at least two dual cameras, if applicable with three or four dual cameras, each with an RGB sensor and with an IR sensor represent a functionally redundant arrangement with regard to the plurality of RGB sensors on the one hand and independently thereof with regard to the plurality of IR sensors on the other hand. The combination of at least one RGB sensor and one IR sensor is form-redundant.

Data acquired or processed by the respective redundancy component can only be used when the component to be replaced is selected. Alternatively, these data of the redundancy component can be used in normal operation to increase an imaging and assignment accuracy and/or to increase an imaging and assignment speed.

The advantages of a vehicle with an optical assembly according to the invention comprising a chassis with ground-side chassis components which define a vehicle stand-up plane when the vehicle is stationary, comprising the camera groups of the optical assembly being mounted at a distance of at least 50 cm from the vehicle stand-up plane, correspond to those already explained above with reference to the optical assembly. The vehicle may be a road vehicle, a rail vehicle or an aircraft. When the optical assembly is implemented in an aircraft, real-time imaging and real-time assignment of environmental objects can be used to monitor, in particular, a take-off or landing procedure. In order to cover as large a solid angle as possible, a baseline networking of the cameras of the different camera groups can be performed in the manner of a dodecahedron or an icosahedron or another surface approximation to a spherical surface or the sections thereof.

An oblique baseline between the cameras of a camera group extending at an angle to the vehicle stand-up plane in the range between 10° and 80°, which is neither exactly horizontal nor exactly vertical to the vehicle arrangement plane, avoids an undesired resonance in the imaging or an undesired misassignment of environmental objects.

Examples of embodiments of the invention are explained in more detail below with reference to the drawing.

DESCRIPTION OF THE PREFERRED EMBODIMENTS

Figure 1:
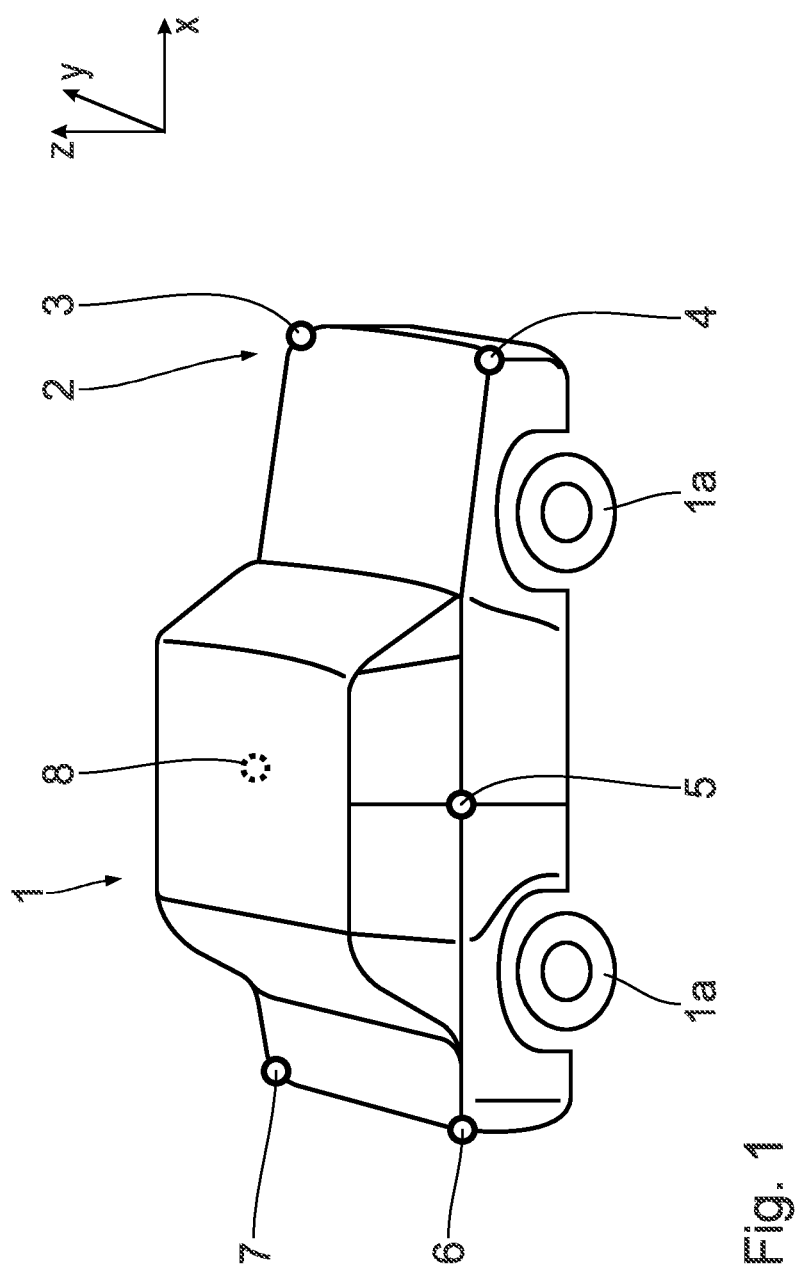
FIG. 1 shows, in a schematic and perspective view from above, a vehicle, designed as a passenger car, with an optical assembly for generating a real-time image and real-time assignment of environmental objects.

FIG. 1 shows a schematic and perspective view of a vehicle 1 with an optical assembly 2 for generating a real-time image and real-time assignment of environmental objects of a current environmental scene. The optical assembly 2 enables the vehicle 1 to move autonomously without the intervention of a driver.

The vehicle 1 shown in FIG. 1 is a passenger car. Another embodiment of a road vehicle, for example a truck, or also a rail or air vehicle, for example a passenger or cargo aircraft or also a helicopter, in particular also a drone, are examples of a corresponding vehicle.

A Cartesian xyz coordinate system is used below to illustrate positional relationships. In perspective FIG. 1, the x-axis runs in the direction of travel of the vehicle 1. The x- and y-axes span a plane parallel to a vehicle stand-up plane, on flat, horizontal ground, i.e. a horizontal plane. The z-axis runs vertically upwards perpendicular to the xy-plane.

The vehicle 1 has a chassis with wheels 1a as chassis components on the ground side, which define a vehicle stand-up plane, namely the xy-plane, when the vehicle 1 is stationary.

The optical assembly 2 has a plurality of camera groups 3, 4, 5, 6, 7 and 8, which are attached to a frame of the vehicle 1 at approximately the height of a circumferential car body belt level, which runs at the height of the upper edges of the vehicle mud wings. The camera groups 3 to 7 are visible in FIG. 1. The camera group 8, which is concealed in the illustration according to FIG. 1, is also indicated schematically.

The two camera groups 3 and 4 are mounted at the front of the vehicle at the two front car body corner regions where the front mud wings, the front lid and the front of the vehicle are respectively adjacent to each other. The two camera groups 5 and 8 are mounted in the region of a lower end of a B-pillar between each of the two side vehicle doors. The two camera groups 6, 7 are each mounted in the region of rear car body corners where the rear mud wings, the luggage compartment lid and a vehicle rear side are adjacent to each other. The camera groups 3 to 8 are mounted at a distance of at least 50 cm from the vehicle stand-up plane xy.

The two camera groups 3 and 4 constitute two front camera groups in relation to the direction of travel x of the vehicle 1 and the camera groups 6 and 7 constitute two rear camera groups. The two camera groups 5 and 8 constitute two lateral camera groups in relation to the direction of travel x of the vehicle 1. Due to the corner-side arrangement of camera groups 3, 4, 6 and 7, these camera groups simultaneously have the function of lateral camera groups, so that camera groups 3, 8 and 7 are also referred to as left-side camera groups and camera groups 4, 5 and 6 are also referred to as right-side camera groups of the vehicle 1.

Figure 2:
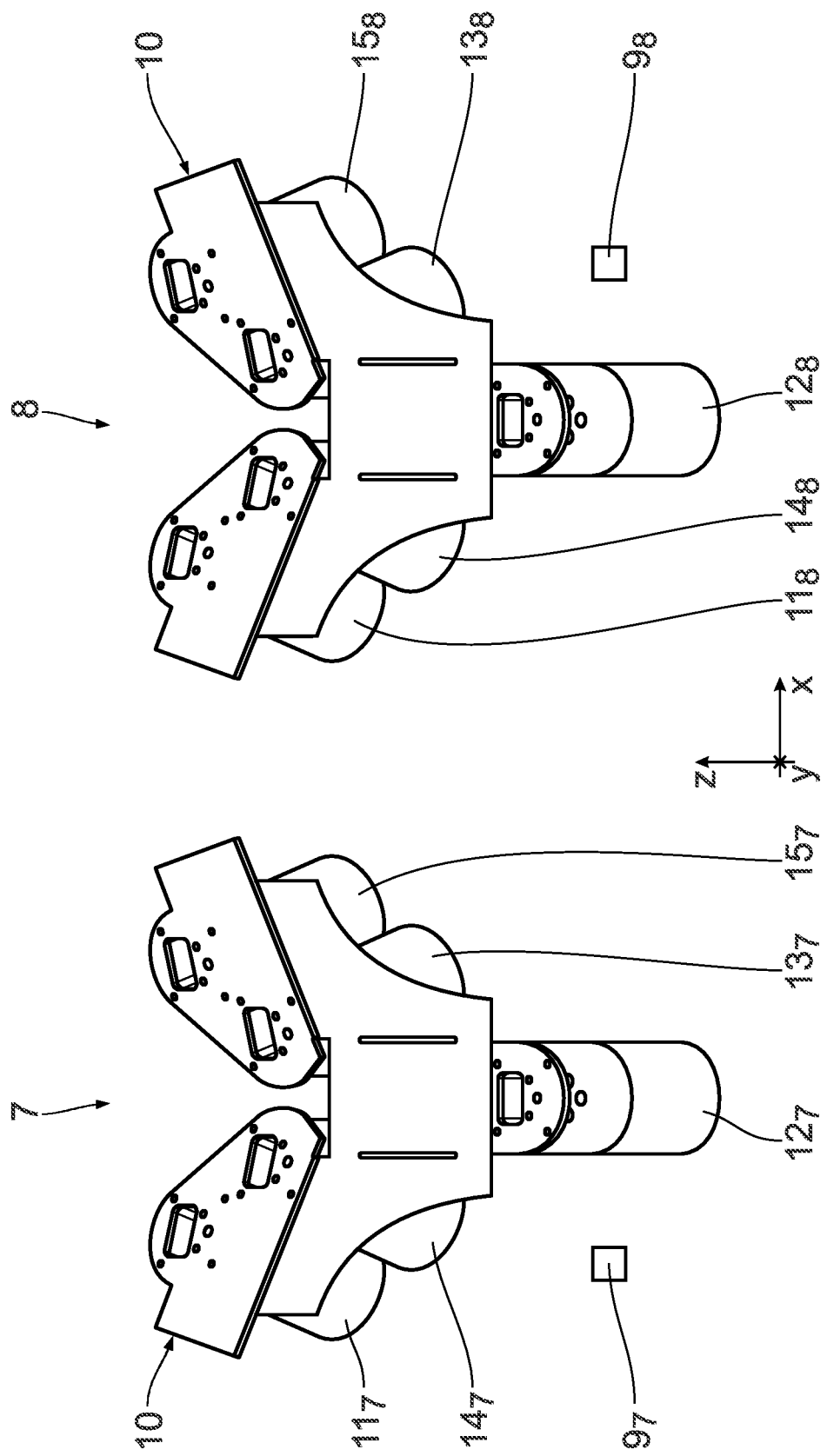
FIG. 2 shows two camera groups of the optical assembly, wherein these camera groups are shown as seen in perspective from a mounting side of a respective group mounting body.

Each of the camera groups has at least three cameras that are linked to each other via a camera signal connection in the form of a data processing unit 9 (cf. FIG. 2).

FIG. 2 shows in greater detail the two camera groups 7 and 8 of the optical assembly 2. The drawing plane of FIG. 2 is parallel to the xz-plane and the viewing direction of FIG. 2 points to a mounting side of the respective camera group 7, 8. The camera groups 3 to 8 are basically constructed in the same way, so that in the following it is mainly sufficient to describe the camera group 7 by way of example. The camera group 7 has a group mounting body 10 for mounting cameras $11_7$, $12_7$, $13_7$ of the camera assembly 7.

The cameras 11 to 13 of the respective camera assembly 3 to 8 are each designated below with an index i, namely the reference numeral of the respective camera group 3 to 8, in order to clarify the assignment of the respective camera 11 to 13 to the respective camera group 3 to 8.

The group mounting body 10 is configured such that it supports the cameras 11 to 13 of the respective camera group 3 to 8 with a fixed relative position and relative orientation to each other. In addition to receptacles for the cameras 11 to 13, the group mounting body 10 also has prepared holding receptacles $14_7$, $15_7$ for mounting additional cameras. The respective camera group 3 to 8 can thus be retrofitted and extended by at least one additional camera to be mounted. In the embodiment example shown, each of the camera groups 3 to 8 has exactly three installed cameras 11 to 13 and exactly two additional prepared receptacles, so that the respective camera group 3 to 8 can be equipped with two cameras, with three cameras, with four cameras or with five cameras, depending on the assignment of these prepared camera holding receptacles. Depending on the embodiment of the group mounting body 10, camera groups with three to, for example, ten cameras are possible.

Figure 3:
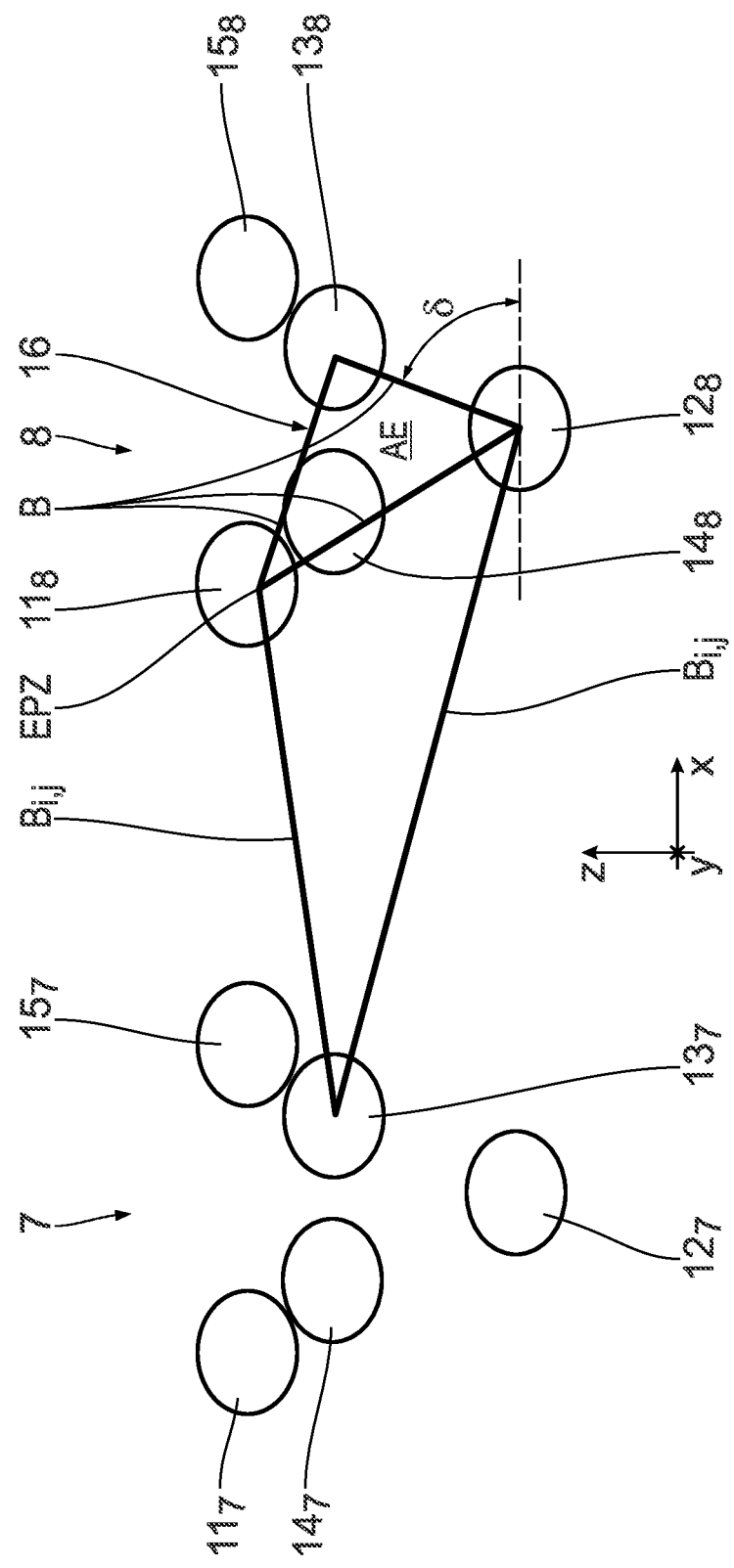
FIG. 3 schematically shows receptacle options of the two group mounting bodies according to FIG. 2 for the mounting of cameras of two camera groups, wherein the holding receptacles used for the mounting of cameras in the version shown are highlighted and wherein connection lines (baselines) between entrance pupil centers of these cameras are also shown for some of the cameras used.

FIG. 3 shows, for selected cameras, namely the camera $13_7$ of camera group 7 and the cameras $11_8$, $12_8$ and $13_8$ of camera group 8, connection lines between entrance pupil centers EPZ of these cameras 11 to 13, which are also referred to as baselines. The entrance pupil centers EPZ of the cameras $11_i$, $12_i$, $13_i$ of a camera group i define a camera arrangement plane AE (cf. FIG. 3 on the right) in which the cameras $11_i$ to $13_i$ of one of the camera groups 3 to 8 are arranged. The camera arrangement plane AE indicated for the camera group in FIG. 3 on the right does not have to run parallel to the xz-plane, nor does it usually do so. An angle between the camera arrangement plane AE and one of the main planes xy, xz, yz of the vehicle coordinates xyz is usually between 10° and 80°.

The length of the baselines B between the entrance pupil centers EPZ of two cameras 11, 12; 11, 13; 12, 13 of a camera group 3 to 8 is in the range between 5 cm and 30 cm. Depending on the embodiment of the camera group 3 to 8, the length of these baselines B can also be in the range between 10 cm and 20 cm or in the range between 10 cm and 15 cm.

In addition, in FIG. 3 intergroup baselines $B_{i,j}$ between cameras 11 to 13 of the two camera groups 7, 8 are highlighted. The lengths of these intergroup baselines $B_{i,j}$ are in the range between 0.5 m and 3 m. This length of the intergroup baselines $B_{i,j}$ is comparable to the distance between the respective adjacent camera groups 3 to 8. The length of the intergroup baselines $B_{i,j}$ can also be in the range between 1 m and 2 m depending on the arrangement of the camera groups 3 to 8.

The length of the baselines $B_{i,j}$ for example between the cameras $11_8$, $12_8$ of the camera group 8 and the camera $13_7$ of the camera group is in the range between 0.5 m to 3 m and may for example be in the range between 1 m and 2 m.

The entrance pupil centers EPZ of the cameras 11 to 13 of one of the camera groups 3 to 8 are located in the corners of a non-equilateral triangle 16. The respective triangle 16 can have two or three different side lengths, i.e. two or three baselines B of different lengths.

The baselines B between the cameras 11 to 13 of a camera group 3 to 8 run at an angle to the vehicle arrangement plane xy in the range between 10° and 80°, i.e. they run neither exactly horizontally nor exactly vertically.

In FIG. 3, an angle δ between the associated baseline B and the vehicle stand-up plane xy is drawn for a camera pairing $12_8$, $13_8$. This angle δ is about 70°, i.e. between 10° and 80°.

The camera groups 3 to 8 are in turn connected to each other via a group signal connection between the respective data processing units 9. Neither the camera signal connections nor this group signal connection is actually shown in FIG. 2.

One of the cameras 11 to 13 of the respective camera group 3 to 8, for example camera 11, may be defined as the master camera and the other cameras 12, 13 as slave cameras as far as signal processing via the data processing units 9 is concerned.

One of the camera groups 3 to 8 can be defined as a master camera group and the others as slave camera groups as far as signal processing via the data processing units $9_i$ is concerned.

Figure 4:
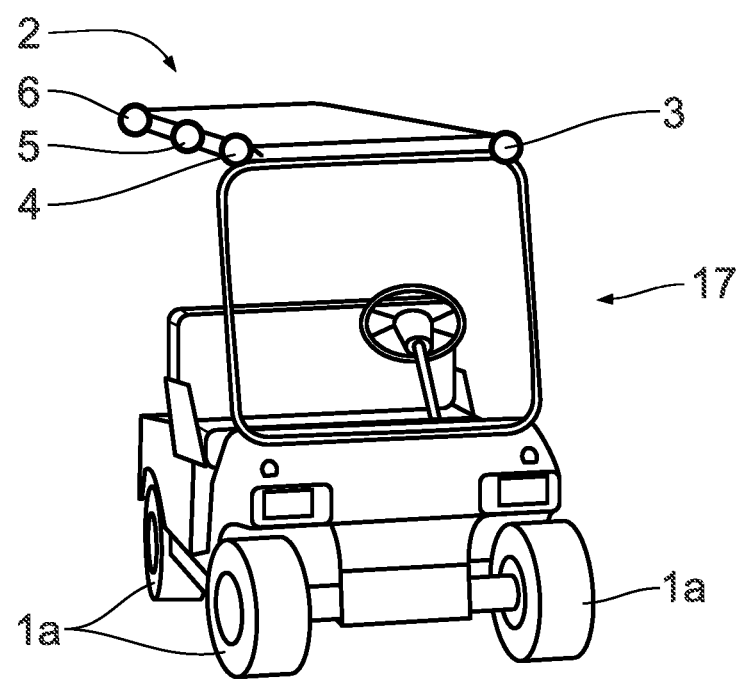
FIG. 4 shows another embodiment of a vehicle, configured as a golf cart, with a further embodiment of the optical assembly for generating a real-time image and real-time assignment of environmental objects using camera groups with the group mounting bodies according to FIG. 2.

FIG. 4 shows a further arrangement variant of the camera groups 3 to 8 on an embodiment of the vehicle 1 as a golf cart. The camera groups 3 to 6 are visible in FIG. 4.

Components and functions corresponding to those already explained above with reference to FIGS. 1 to 3 bear the same reference numerals and are not discussed again in detail.

The camera groups 3 to 8 are arranged in the roof region of the vehicle 17 according to FIG. 4, wherein the assignment of the camera groups 3 to 8 to the directions "front", "rear", "left side" and "right side" is as explained above in connection with the vehicle 1 according to FIG. 1.

Figure 5:
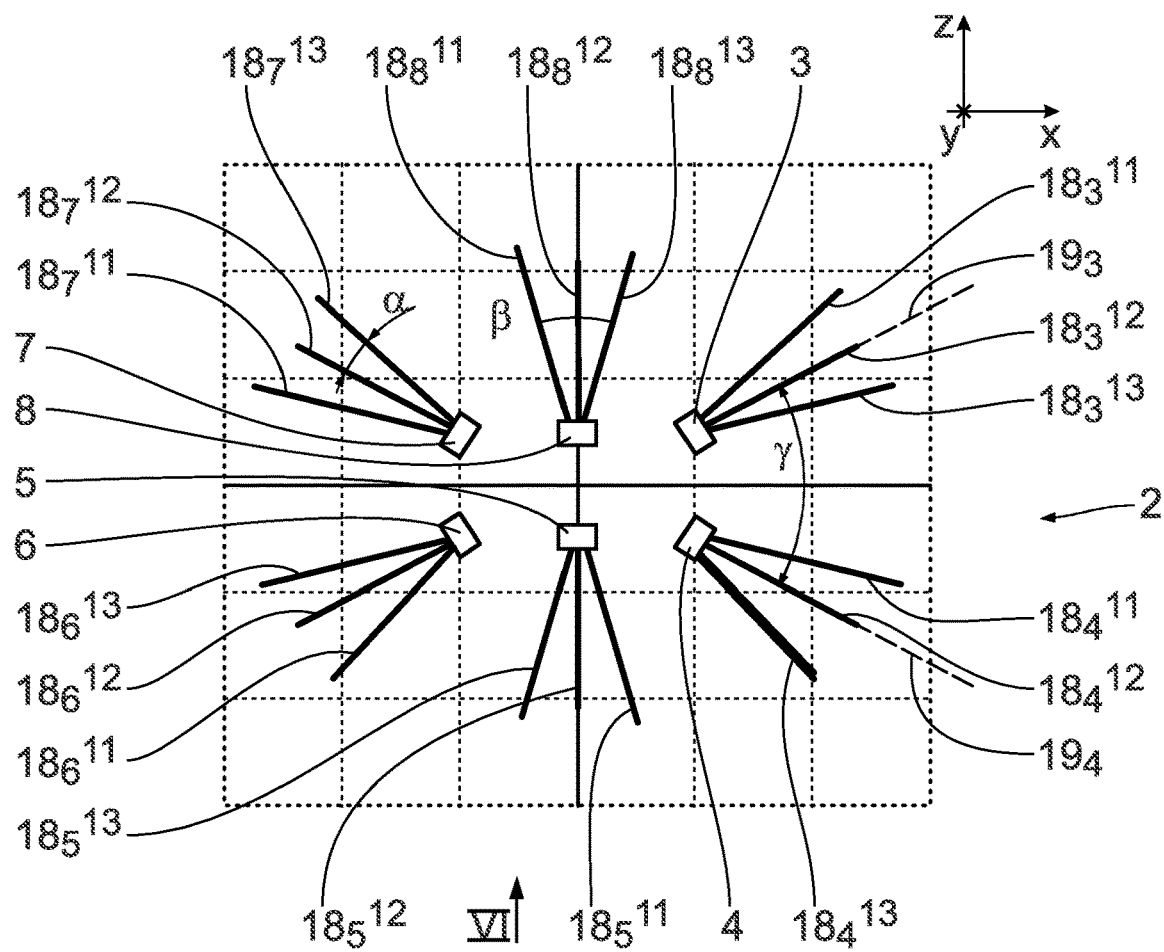
FIG. 5 shows a schematic top view of a camera arrangement of the optical assembly according to FIG. 1 or 4, wherein image capture directions of the cameras of the camera groups of the optical assembly are shown.
Figure 6:
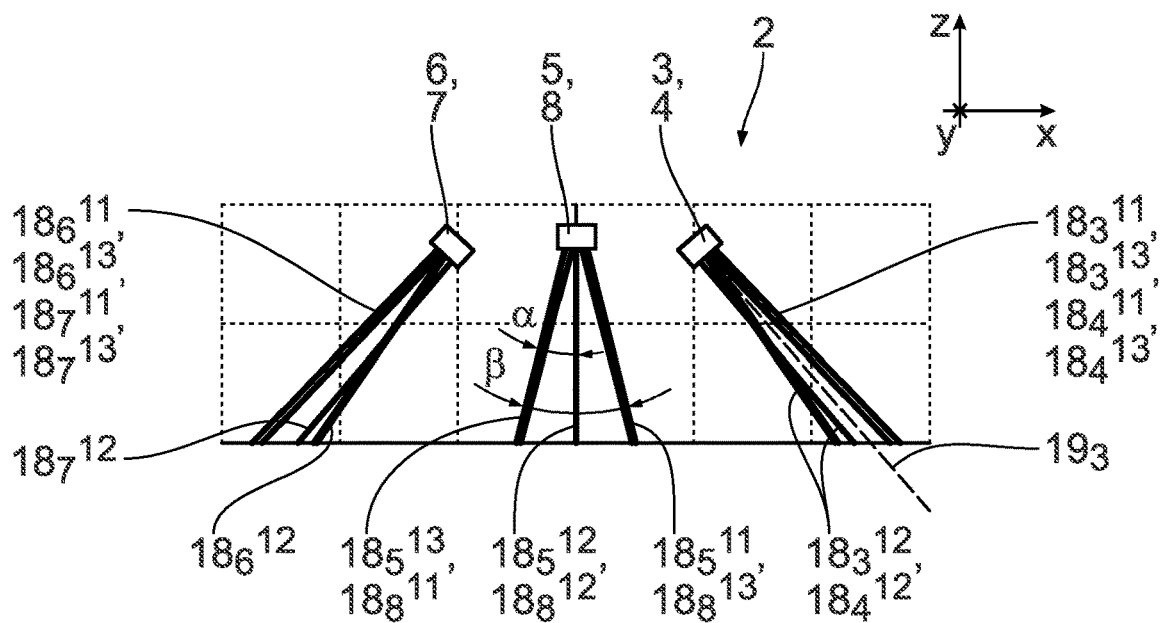
FIG. 6 shows a side view of the image capture directions of the optical assembly according to FIG. 1 or 4, seen from viewing direction VI in FIG. 5.

Image capture directions of the cameras 3 to 8 are illustrated in FIGS. 5 and 6 using the example of the arrangements of the optical assembly 2 according to FIGS. 1 and 4. FIG. 5 shows a top view onto the vehicle 1 or 17, wherein only the cameras 3 to 8 are represented, and FIG. 6 shows a corresponding side view.

In FIGS. 5 and 6, a respective image capture direction 18 of the cameras 11 to 13 is shown double-indexed in the form $18_i^j$, with the index i representing the assignment of the image capture direction 18 to the respective camera group 3 to 8 and the index j representing the assignment to the respective camera 11 to 13 of this camera group 3 to 8.

Adjacent image capture directions $18_i^{11}$ to $18_i^{13}$ of the cameras 11 to 13 of one of the camera groups i have a single camera angle α with respect to each other, which is in the range between 5° and 25° and for example 15°.

Typically, each of the camera groups i (i=3 to 8) covers a total image capture angle β of typically 30° over the image capture directions $180_i^{11}$ to $18_i^{13}$.

The image capture directions $180_i^{11}$ to $18_i^{13}$ of the cameras 11 to 13 of one of the camera groups i can each be assigned a direction mean value 19. For camera group 3, the direction of such a direction mean value $19_3$ is shown dashed in FIGS. 5 and 6. This respective direction mean value $19_3$ is the mean value of the image capture directions $18_3^{11}$ to $18_3^{13}$. The direction mean values $19_i$, $19_j$ of the image capture directions of the cameras 11 to 13 of adjacent camera groups i, j assume a group camera angle γ (cf. FIG. 5) with respect to one another which is in the range between 30° and 100° and which, in the embodiment according to FIGS. 5 and 6, is approximately 60°.

In an embodiment of the optical assembly 2 not shown, there may also be fewer than six camera groups, for example three camera groups, four camera groups or five camera groups. More than six camera groups are also possible.

The camera groups can be arranged such that a horizontal total coverage (azimuth angle of polar coordinates) of 360° is achievable, as is the case with the arrangement of camera groups 3 to 8 according to FIGS. 1 to 6. The arrangement of the camera groups can also be such that a total vertical coverage (polar angle of polar coordinates) of 180° is achieved. Regularly, this is not required for land vehicles, which is why this overall vertical coverage is not achieved with the arrangements of camera groups 3 to 8 according to FIGS. 1 to 6. In the case of arrangements of camera groups, in particular for aircrafts, a vertical total coverage can be achieved which is greater than 90°, which is greater than 120°, which is greater than 150° and which is in particular 180°. The cameras of the camera groups can in particular be configured as fisheye cameras.

Figure 7:
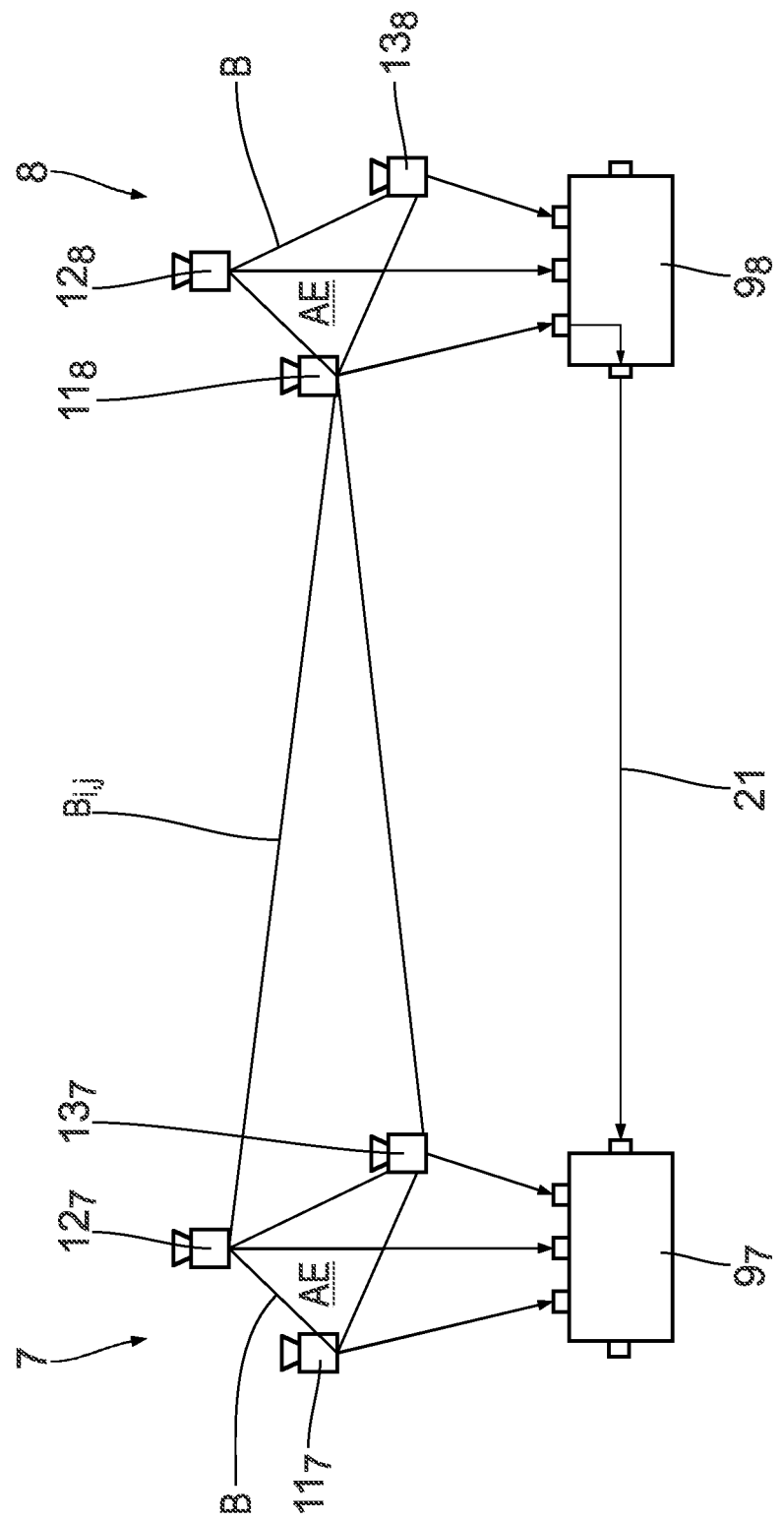
FIG. 7 in a similar representation to FIG. 3, shows two camera groups of the optical assembly with additional signal processing components.

With reference to FIG. 7, a method for generating a redundant image of a measurement object is explained below. Components and functions corresponding to those already explained above with reference to FIGS. 1 to 6 bear the same reference numerals and are not discussed in detail again.

FIG. 7 shows two groups 7, 8, each including three cameras 11 to 13. The groups 7 on the one hand and 8 on the other hand each have an associated data processing unit $9_7$, $9_8$ for processing and evaluating the image data captured by the associated cameras of the camera group 7, 8. The two data processing units $9_7$, $9_8$ have a signal connection with each other via a signal line 21.

To capture a spatial scene, the cameras $11_7$ to $13_7$ of group 7 can be interconnected, for example, so that a 3D capture of this spatial scene is possible. To create an additional redundancy of this spatial image capture, the image capture result of, for example, camera $11_8$ of the further group 8 can be used, which is made available to the data processing unit $9_7$ of group 7 via the data processing unit $9_8$ of group 8 and the signal line 21. This signal line 21 represents a group signal connection between the camera groups 7 and 8. Due to the spatial distance of camera $11_8$ to cameras $11_7$ to $13_7$ of group 7, there is a significantly different viewing angle when imaging the spatial scenery, which improves the redundancy of the spatial image capture.

Spatial image capture using the cameras of precisely one group 7, 8 is also referred to as intra-image capture. A spatial image capture involving the cameras of at least two groups is also called inter-image capture.

Once the objects have been detected and assigned, triangulation can be used to determine the distance of the objects. For example, triangulation can be carried out independently with the stereo arrangements of the cameras $12_8$, $13_8$, the cameras $13_8$, $11_8$ and the cameras $11_8$, $12_8$. The triangulation points of these three arrangements must match in each case.

A camera group in the manner of groups 7, 8 can be arranged in the form of a triangle, for example in the form of an isosceles triangle. An arrangement of six cameras in the form of a hexagon is also possible.

A camera close range covered by the respective group 7, 8 can, for example, be in the range between 80 cm and 2.5 m. By adding at least one camera of the respective other group, a long-range beyond the close-range limit can also be captured with the image capture apparatus. Such a long range overlaps with the camera's close range in terms of its lower limit and has an upper limit that is, for example, 50 m, 100 m or 200 m.

Each of the cameras 11 to 13 has a sensor chip, which can be a CCD or CMOS chip. The sensor chip is configured as a two-dimensional pixel array. Each of the pixels may be rectangular or square with a typical pixel extension in the sensor chip plane in the range between 1 μm and 20 μm. Such a typical pixel extension may be in the range between 2 μm and 10 μm and in particular in the range between 3 μm and 5 μm. A ratio between a lens focal length of a camera optics and the pixel extension may be in the range between 100 and 1,000. In particular, this ratio is in the range between 500 and 700.

The camera can provide a resolving capacity that is better than the pixel extension. For example, a ratio between the achievable resolution and the pixel extension may be in the range between 0.1 and 0.5.

In the range of the respective upper limit of the object distance, a distance error in the range between 1% and 5% can be tolerated. For an object distance upper limit (exclusive use of intra-baselines) of 6 m, for example, this results in a distance error of 15 mm With an object distance upper limit (exclusive use of inter-baselines) of 120 m, this results in a distance error in the range of 3 m, for example.

Figure 8:
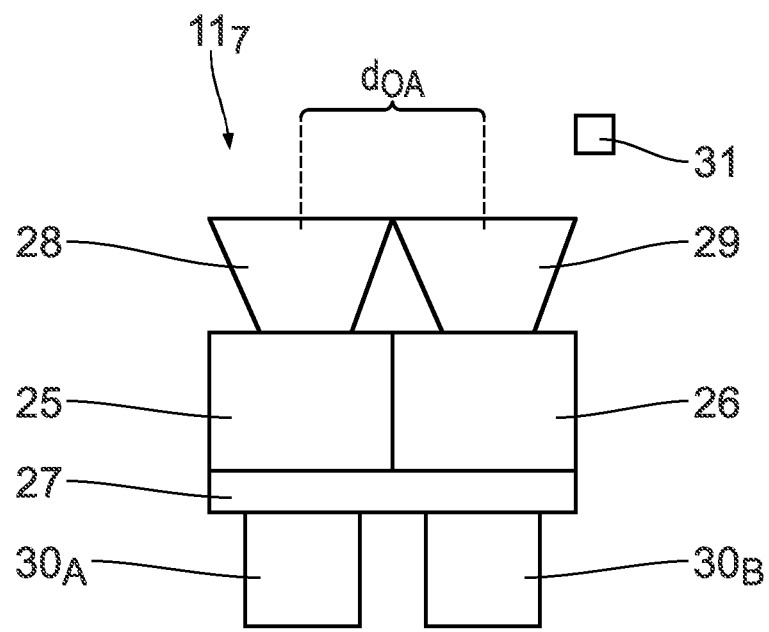
FIG. 8 shows a camera of one of the camera groups, configured as a dual camera with an RGB sensor and with an IR sensor.

FIG. 8 shows an embodiment of one of the cameras 11 to 13 that can be used, for example, instead of the (single) camera $11_7$ according to FIG. 3 or 7. Camera $11_7$ is configured as a dual camera with an RGB sensor 25 and an IR sensor 26. The RGB sensor 25 is designed to capture colored information in the visible optical wavelength range. Instead of the RGB sensor 25, a monochrome sensor for the visible wavelength range can also be used. The IR sensor 26 is sensitive to infrared wavelengths beyond the visible wavelength range. The sensors 25 and/or 26 may be configured as CCD sensors or CMOS sensors. The sensors 25 and/or 26 are configured as array sensors with sensor pixels arranged in rows and columns.

The two sensors 25, 26 are mounted on a common carrier 27. The two sensors 25, 26 are each equipped with a camera optics 28 (for the RGB sensor 25) and 29 (for the IR sensor 26). The two camera optics 28, 29 are separated from each other, but spatially arranged close to each other. A distance $d_{OA}$ between the optical axes of the two camera optics 28, 29 indicated by dashed lines in FIG. 8 is at most 35 mm. This distance $d_{OA}$ can be in the range between 20 and 30 mm and can also be smaller, for example in the range between 10 mm and 20 mm or also in the range between 5 mm and 15 mm. The small distance do A ensures a negligible image offset of the camera optics 28, 29. This facilitates the evaluation of the acquisition data on the sensors 25, 26. In an alternative embodiment not shown, the dual camera $11_7$ has a common camera optics for both sensors 25, 26.

The dual camera $11_7$ has two signal outputs $30_A$, $30_B$ for reading out data on the sensors 25, 26 to a data processing module system, which is explained in particular in more detail below. The signal outputs $30_A$, $30_B$ are parallel signal outputs.

In addition, the dual camera $11_7$ or the optical assembly 2 in general can be equipped with an IR light source 31 which illuminates the objects to be detected and assigned with the cameras 11 to 13 with IR light. This IR illumination by the IR light source 31 may be an illumination for generating an IR texturing. This IR texturing may be configured such that it does not have a regular pattern. This IR illumination facilitates a detection and assignment of the environmental objects or a detection and assignment of corresponding object features or object signatures.

The IR light source 31 may be a laser. The IR light source can provide a short exposure of environmental objects. The respective camera 11 to 13 or the optical assembly 2 in general can be equipped with a narrow-band filter for selecting specific wavelength ranges. This can be used to pre-filter the imaging light that reaches the sensors 25 or 26. When a narrow-band IR filter is used, ambient light can be effectively filtered, except for heat sources. Alternatively or additionally, a corresponding pre-filtering can also be carried out temporally with the help of a shutter that is synchronized in particular with a pulse frequency of the IR light source 31.

Instead of a dual camera of the type of camera $11_7$ shown in FIG. 8 with separate sensors 25, 26, an RGBIR sensor can also be used, which is also not shown in the drawing. This RGBIR sensor can be operated with a three-step acquisition sequence. With a long exposure time, an RGB component can be captured. In the course of a first short exposure step, a first IR exposure component can be captured and in the course of a second short exposure step, a second IR exposure component can be captured. Both IR exposure components can be subtracted from each other.

A corresponding RGBIR sensor is basically known from the technical brochure "RGB+IR Technology", available at www.framos.com.

With an RGBIR sensor of this type, both visible wavelengths (RGB, red green blue) and infrared wavelengths (IR) can be measured with precisely one sensor array.

Such an RGBIR sensor can be operated as follows: At one point in time t1, RGB signals are read in during an exposure time of, for example, 10 ms. At another point in time t2, IR signals are read in with simultaneous IR exposure during a period of less than 1 ms. At a further point in time t3, IR signals are read in without additional IR exposure. The difference of the images at the points in time t2 and t3 represents, apart from an object movement in the intermediate period, exclusively the effect of the IR exposure, thus eliminating daylight or sunlight components. The RGB point in time t1 should be at or between the points in time t2 and t3.

The IR sensor of the dual camera of the type of camera $11_7$ or an IR sensor part of an RGBIR sensor can have two charge memories. With the aid of such an IR sensor with two charge memories, IR difference images corresponding to what was explained above in connection with the images at the points in time t2 and t3 can already be obtained from a charge difference of two charges one captured shortly after the other with such an IR sensor.

A data readout of the two sensors 25, 26 can be done in a stitched manner so that, for example, one line of the RGB sensor 25 is read out followed by one line of the IR sensor 26. In this way, RGB and IR information can be assigned to a candidate object point.

Alternatively, it is possible to read out both sensors 25, 26 sequentially.

Figure 9:
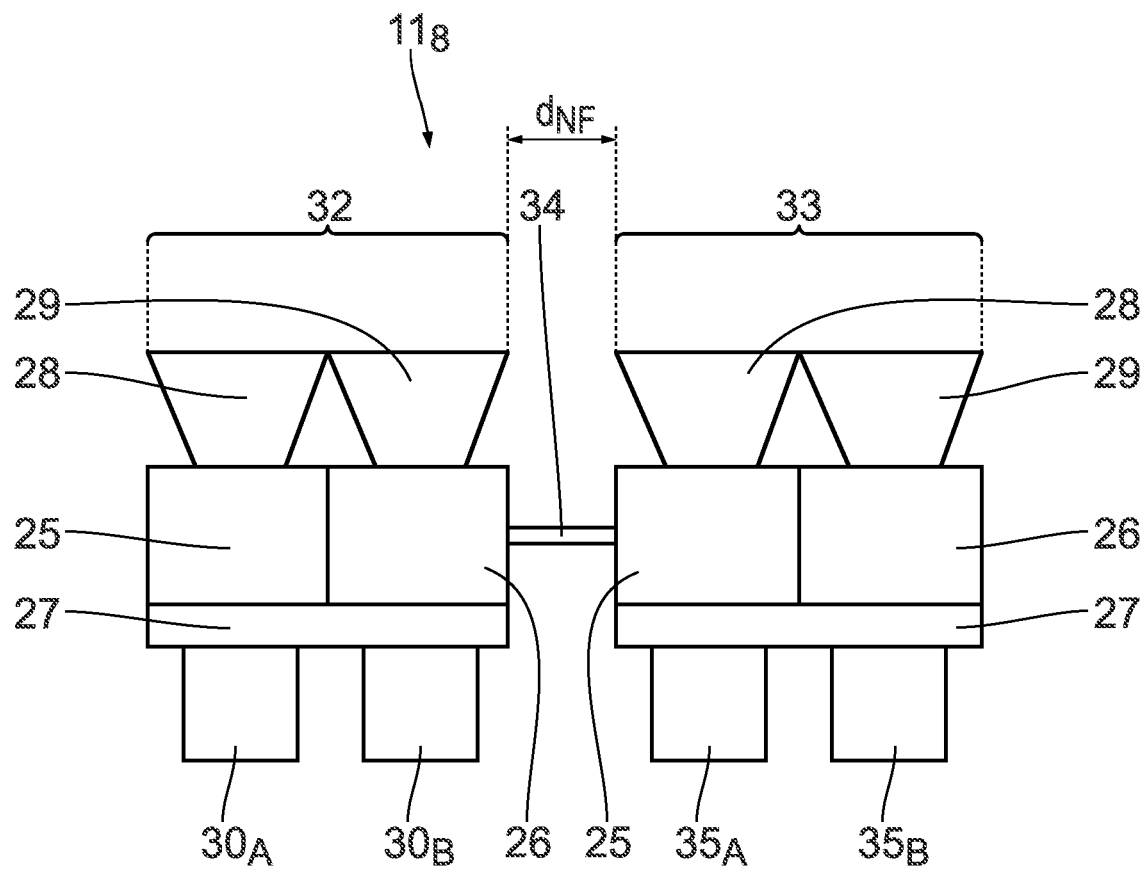
FIG. 9 shows a camera of one of the camera groups, configured as a hybrid camera with a close-range optics and with a long-range optics.

FIG. 9 shows an embodiment of one of the cameras 11 to 13 as a hybrid camera which can be used instead of, for example, the (single) camera $11_8$. This hybrid camera 11 has a close-range optics 32 and a long-range optics 33. The close-range optics 32 can be a fisheye lens. The long-range optics 33 can be configured as telephoto optics.

The close-range optics 32 is part of a close-range dual camera of the type of dual camera $11_7$, which was explained above with reference to FIG. 8. The long-range optics 33 is part of a dual long-range camera also with the basic structure corresponding to dual camera $11_7$ in FIG. 8. Accordingly, the same reference numerals are assigned in FIG. 9 for components corresponding to those in FIG. 8. The two range optics 32, 33 of the hybrid camera $11_8$ each have a carrier 27 assigned to them. The two carriers 27 are firmly connected to each other by a rigid connection component 34. The rigid connection component 34 ensures that there is no undesired displacement between the two carriers 27 of the range optics 32, 33.

A lateral distance $d_{NF}$ between the close-range optics 32 and the long-range optics 33 is smaller than 50 mm and can be smaller than 25 mm, smaller than 20 mm, smaller than 15 mm or also smaller than 10 mm. This distance between the two range optics 32, 33 can in particular be so small that an image offset between the close-range optics 32 and the long-range optics 33 is not significant in the data evaluation within the optical assembly 2.

Signal outputs to the sensors 25, 26 of the long-range optics 33 are designated $35_A$ and $35_B$ in FIG. 9 and basically correspond to the signal outputs $30_A$, $30_B$ explained above in connection with FIG. 8.

The long-range optics 33 can be designed to detect objects at a distance in the range between 50 m and 300 m, in particular in the distance range between 80 m and 150 m, for example in the distance range of 100 m.

The long-range optics 33 provides higher distance resolution in this larger distance range. The distance range where the long-range optics 33 provides high resolution is either immediately adjacent to or overlaps with the distance range where the close-range optics 32 provides high resolution.

A vertical angle between the at least one optical axis of the long-range optics 33 to the horizontal may be smaller than a corresponding angle of the at least one optical axis of the close-range optics 32 to the horizontal.

Instead of the close-range optics 32 and/or the long-range optics 33 and generally instead of fixed focal length camera optics of the type of camera optics 28 and 29, a zoom optics with a focal length that can be preset in a focal length range can be used. The focal length of such a zoom optics can be predefined by means of an actuator. Such an actuator can have a signal connection with a central control/regulation unit of the optical assembly 2, with which in turn the data processing module system has a signal connection.

Such a zoom camera can provide intrinsic calibration for different zoom positions.

A zoom optics of this type can be used in particular for robotic applications of the optical assembly 2.

Figure 10:
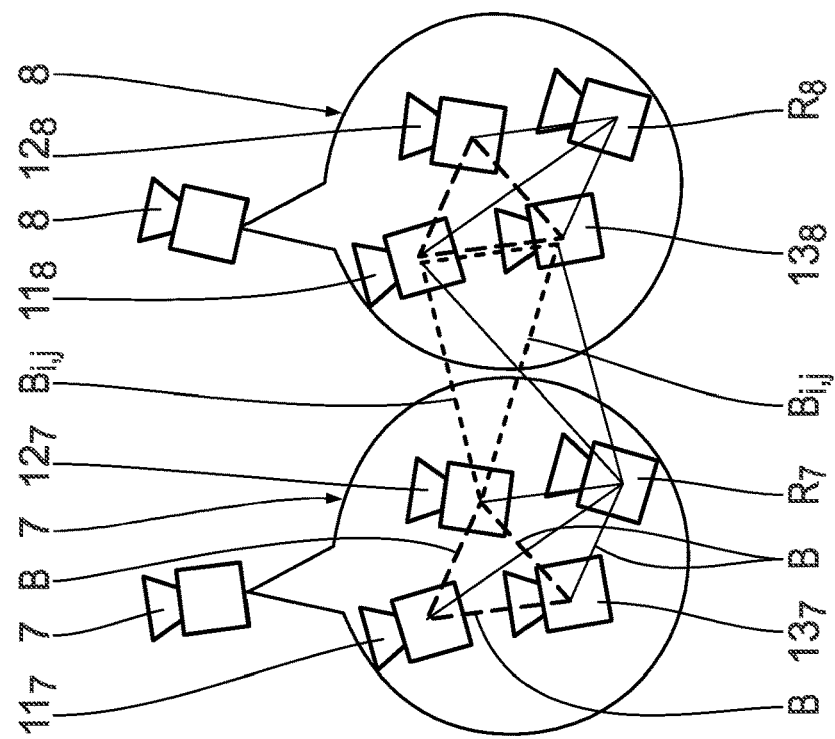
FIG. 10 shows, in a more detailed representation compared to FIG. 3, two camera groups as well as possible baseline connections between individual cameras of these two camera groups.

FIG. 10 shows an example of two camera groups 7, 8, in an illustration similar to FIG. 7, for example, which can be used instead of the camera groups 3 to 8 described above. The four single cameras $11_7$, $12_7$, $13_7$, $R_7$ as well as $11_8$, $12_8$, $13_8$ and $R_8$ are schematically combined again in FIG. 10 at the top in each case as a schematic camera group 7, 8.

The respective camera groups 7, 8 thus each have four single cameras. The fourth camera $R_7$ each of camera group 7 and $R_8$ of camera group 8 is an additional redundancy camera. This can be used to ensure fail-safety of the respective camera group 7, 8, which nominally requires, for example, three functioning single cameras (fail-operational status).

FIG. 10 again shows the intra-baselines B between the individual cameras of one of the two camera groups 7, 8 and the inter-baselines $B_{i,j}$ between selected cameras of different camera groups 7, 8. Those baselines that are used for a current object assignment are highlighted by thicker lines. The two redundancy cameras $R_7$, $R_8$ are not considered in this baseline usage example and therefore do not participate in the data processing in this failure-free state.

Figure 11:
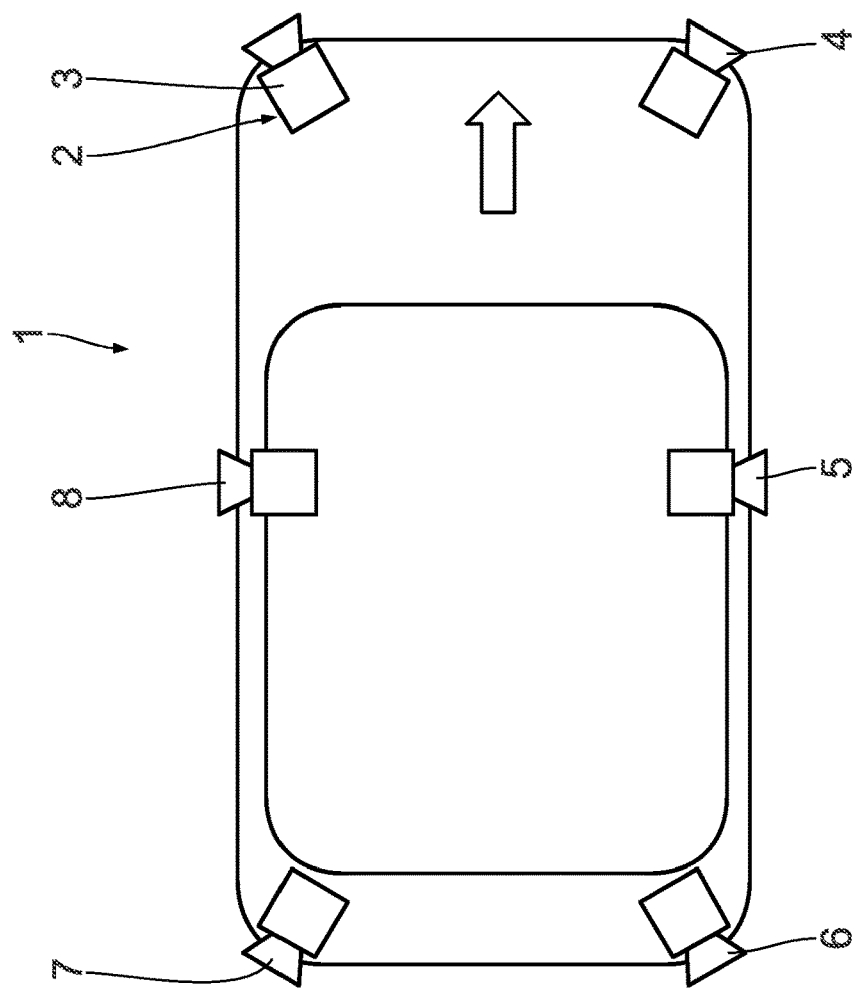
FIG. 11 shows a top view onto an arrangement of a total of six camera groups on a carrier, corresponding to the one shown in FIG. 4.

FIG. 11, in a representation corresponding to FIGS. 1 and 4, shows an exemplary arrangement of six camera groups 3 to 8 as components of the optical assembly 2 of the vehicle 1. Each of the individual camera groups 3 to 8 can cover a close range, as already explained above. Insofar as one of the camera groups 3 to 8 is equipped with a long-range optics 33, this camera group can also individually cover a long range. An interaction of two, in particular adjacent, camera groups, for example camera groups 7 and 8, enables a long-range evaluation by using the inter-baselines $B_{i,j}$, as already explained above.

In addition to optics-based cameras, the optical assembly may also have at least one lidar sensor, which provides additional error redundancy for object detection and assignment. The measurement using such a lidar sensor leads to a form redundancy in addition to the optical object distance measurement performed with the optical assembly 2. In lidar measurement, light pulses can be measured to measure a time offset and converted into a distance signal by multiplication by the speed of light. Alternatively or additionally, a phase between a transmitted and a received light intensity wave can be determined in the lidar measurement, which is then converted into a time offset and finally into a distance value with the aid of the speed of light.

Figure 12:
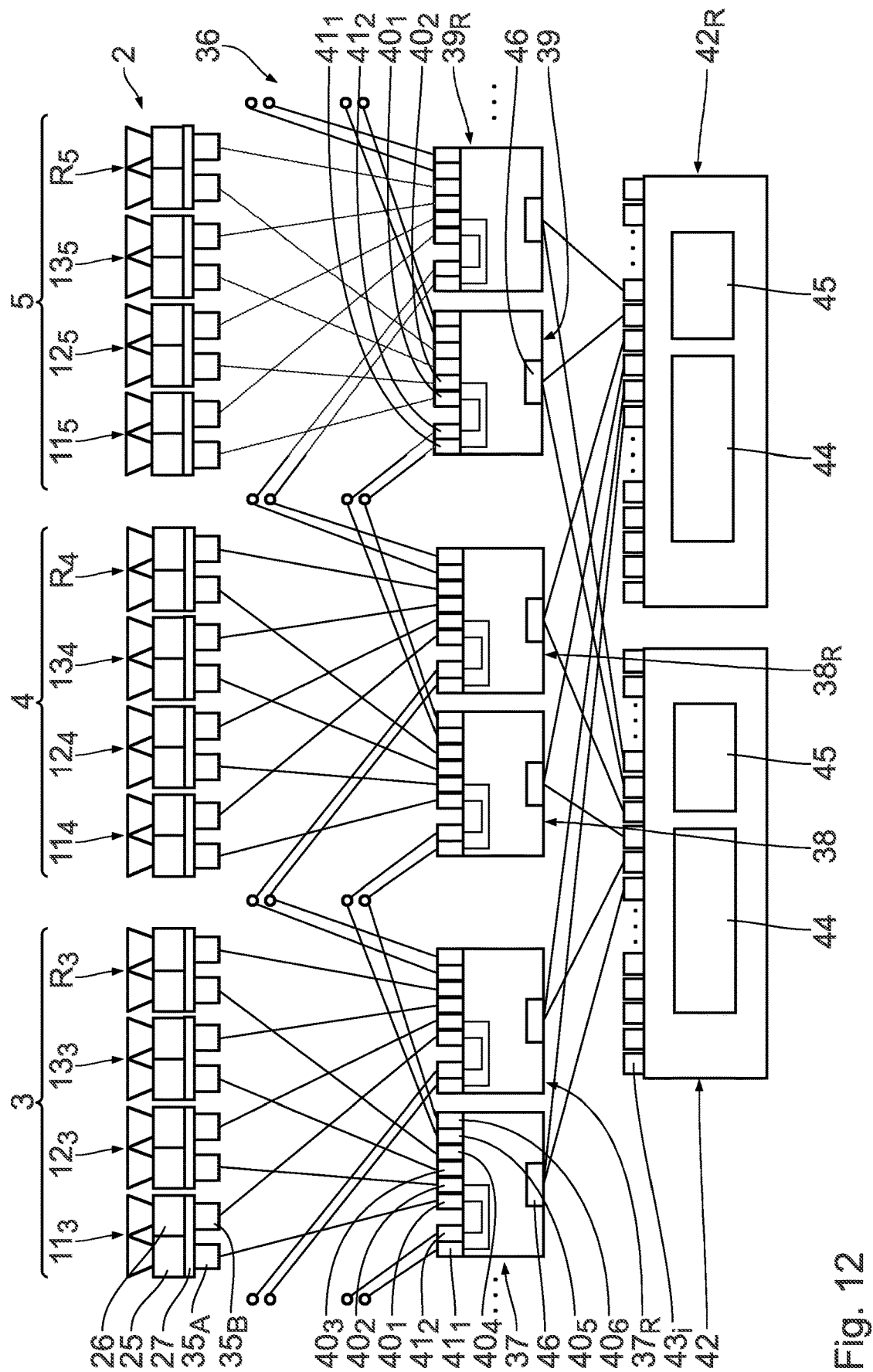
FIG. 12 schematically shows a circuit diagram of an embodiment of the optical assembly, exemplarily shown for three camera groups, wherein exemplary signal connections are illustrated between the cameras of the camera groups designed as dual cameras according to FIG. 8, between data processing group modules (nodes) which are in each case assigned to the camera groups as well as between a data processing main module which is assigned to all camera groups.

FIG. 12 shows details of a data processing module system 36 of the optical assembly 2. In FIG. 12, a total of three camera groups is shown using the example of camera groups 3 (front left), 4 (front right) and 5 (center right) in the arrangement on the vehicle 1, for example as shown in FIG. 11.

Each of the cameras $11_3, \ldots R_3$; $11_4, \ldots R_4$; $11_5, \ldots R_5$ is listed as a dual camera according to what has been explained above, in particular with reference to FIGS. 8 and 10.

The data processing module system 36 has at least one data processing unit for processing the camera data of the single cameras of the camera groups 3 to 8 for real-time imaging and real-time assignment of the environmental objects or object features or object signatures.

The data processing module system 36 has data processing group modules, also referred to as nodes, which are assigned to camera groups 3 to 8. The data processing group modules 37 and $37_R$ are assigned to camera group 3. The data processing group modules 38, $38_R$ are assigned to camera group 4. The data processing group modules 39, $39_R$ are assigned to camera group 5. The group modules $37_R$, $38_R$, $39_R$ are redundancy data processing group modules, which are either only used in the event of a failure of the group modules 37, 38, 39 to be replaced or process signal data of the assigned cameras of camera groups 3 to 5 in normal operation to increase the imaging and assignment accuracy and/or assignment speed.

The data processing group modules 37 to 39, $37_R$ to $39_R$ have the same structure, so that it is sufficient below to describe essentially one of the group modules, which is done using the example of the group module 37.

The data processing group module 37 has a total of six signal inputs $40_1$ to $40_6$, which are combined to form a multipole signal input 40. The signal inputs $40_1$ to $40_3$ are connected to the signal outputs $35_A$ of the cameras $11_3$ to $13_3$ of camera group 3. The signal input $40_4$ is connected to the signal output $35_A$ of the redundancy camera $R_3$ of camera group 3. The signal inputs $40_5$ and $40_6$ are in signal connection with signal outputs $41_1$, $41_2$ of the data processing group module 38 of camera group 4.

The signal inputs $40_1$ and $40_2$ of the group module 37 are in signal connection with the corresponding signal outputs $41_1$, $41_2$ of this group module 37.

Via the signal connection between different group modules, in this case between the group modules 37 and 38 via the signal outputs $41_1$, $41_2$ of the data processing group module 38 of camera group 4 with the signal inputs $40_5$ and $40_6$ of the data processing group module 37 of camera group 3, an inter-baseline evaluation can be carried out by the data processing module system 36 on the level of the data processing group modules 37, 38, . . . . The integration of a main module of the data processing module system 36, which is still to be described, is not necessary for this.

Signal outputs $41_1$, $41_2$ of the group module 39 of camera group 5 are also in signal connection with signal inputs $40_5$, $40_6$ of the group module 38 of camera group 4 via corresponding signal connections.

Via this direct connection between the signal outputs $41_i$ and signal inputs $40_i$ of the group modules, which are assigned to different camera groups, a fast inter-baseline calculation is possible at the group level. An additional inter-baseline calculation is also possible at the level of the data processing main modules 42, $42_R$.

Here, as in the embodiment shown in FIG. 12, the signal outputs of two cameras, for example cameras $11_4$, $12_4$ of camera group 4 can be routed to the signal inputs of the group module 37 of camera group 3, or the data of more or fewer cameras can be exchanged directly between the groups at the group level. Signal connections at the group module level to create a ring of adjacent camera group assignments or even a network between the camera groups are also possible. Such networking may be particularly useful if the optical assembly 2 is used in aviation.

The additional redundancy data processing group modules $37_R$, $38_R$ and $39_R$, which in turn can replace the group modules 37, 38 and 39 in the event of a failure or alternatively can be used to increase the imaging and assignment accuracy and/or to increase the imaging and assignment speed, are constructed in the same way as the group modules 37 to 39.

The signal inputs $40_1$ to $40_4$, for example, of the redundancy data processing group module $37_R$ are in signal connection with the signal outputs B of cameras $11_3$, $12_3$, $13_3$ and $R_3$. In each case one of the cameras $11_i$, $12_i$, $13_i$, $R_i$ thus supplies one group module and one redundancy group module via the two signal outputs $35_A$, $35_B$. Alternatively, instead of, for example, three cameras with two signal outputs $35_{A/B}$ each, six cameras with one signal output 35 each could be used.

The signal inputs $40_5$ and $40_6$ of the redundancy data processing group module $37_R$ are in signal connection with the signal outputs $41_1$, $41_2$ of the redundancy data processing group module $38_3$ of the adjacent camera group 4. The signal outputs $41_1$, $41_2$ of the redundancy data processing group module $37_R$ are in turn in signal connection with signal inputs $40_5$, $40_6$ of a further, not shown redundancy data processing basic module.

The signal outputs $41_1$, $41_2$ of the data processing basic module 37 are in signal connection with signal inputs $40_5$, $40_6$ of another, not shown, data processing basic module.

This signal interconnection ensures that the respective camera 11; of one of the camera groups 3, 4, 5, . . . can be used for inter-data processing together with the acquisition data of the cameras of another camera group 3, 4, 5, . . . .

The respective data processing group modules, for example the data processing group module 37 and the redundancy data processing group module $37_R$ are each assigned to precisely one of the camera groups, in this case camera group 3.

The data processing group modules 37 to 39, . . . as well as the redundancy data processing group modules $37_R$ to $39_R$, . . . provide a first, fast signal processing level of the data processing module system 36.

On this fast data processing group level of the group modules 37 to 39, . . . or $37_R$ to $39_R$, . . . the capture and assignment of the object images in the form of, for example, point clouds takes place in real time. At this group module level, it is thus clarified which significant objects are present, what distance these objects have from the camera groups and whether these objects are moving relative to the camera groups and, if so, at what speed.

The data processing module system 36 further includes a data processing main level. The latter points to a data processing main module 42, which is assigned to all camera groups 3 to 5, . . . . The data processing main module 42 is in signal connection with the group modules 37 to 39, . . . and $37_R$ to $39_R$, . . . via signal connections $43_i$, which may be Ethernet signal connections.

A data communication between cameras $11_i$ to $13_i$, $R_i$ on the one hand and the group modules 37 to 39, . . . ; $37_R$ to $39_R$, . . . on the other hand as well as between these group modules 37 to 39, . . . ; $37_R$ to $39_R$, . . . on the one hand and the data processing main modules 42 can be carried out according to a MEPI/CSI interface standard.

The data processing main module 42 has a main processor 44 and a coprocessor 45. The main processor 44 is verified and monitored by the coprocessor 45. The main processor 44 reads out the results of all group modules 37 to 39, . . . ; $37_R$ to $39_R$, . . . via their respective communication interfaces 46. The main processor 44 compares the results of these different group modules 37 to 39, . . . as well as, if applicable, the connected redundancy group modules $37_R$ to $39_R$, so that additional failure security is provided in this way, in particular in overlapping regions of the fields of view of the camera groups 3 to 5, . . . . In addition, the main processor 44 forwards control signals from the results of the acquisition and processing of the data from the group module level on the one hand to the optical assembly 2 and on the other hand to the unit equipped therewith, for example to the vehicle 1.

In addition, a redundancy data processing main module $42_R$ is also provided in the main level of data processing, which redundancy data processing main module $42_R$ is configured in the same way as the data processing main module 42 and is correspondingly interconnected with the group modules 37 to 39, . . . ; $37_R$ to $39_R$, . . . . The redundancy data processing main module $42_R$ is used when, for example, the coprocessor 45 of the data processing main module 42 concludes that results of the main processor 44 of the data processing main module 42 are not reliable, or when the data processing main module 42 shuts down for other reasons. As an alternative to a pure failure replacement of the data processing main module 42 by the redundancy data processing main module $42_R$, this redundancy data processing main module $42_R$ can also be used in normal operation to increase the imaging and assignment accuracy and/or to increase the imaging and assignment speed and thereby operate in parallel to the data processing main module 42.

The overlapping of coverages, in particular of adjacent camera groups 3 to 8, as explained above, enables a comparison of overlapping acquisition data and a comparison of intra- and inter-baseline detections within the data processing module system 36. For example, up to four overlapping comparisons of the capture of one and the same object by means of correspondingly four different inter- and intra-baselines can be performed thereby, which leads to a corresponding error redundancy. This additional error redundancy can lead to a reduction of a required certification effort with regard to error tolerance.

Corresponding overlapping regions of the coverages, in particular of adjacent camera groups 3 to 8, can be further evaluated between a smallest expected relevant object size and a largest expected relevant object size. These size ranges can be predetermined depending on the application of the optical assembly. For example, when used on a vehicle, a smallest size may have a typical dimension of 5 cm and a largest object size may have a typical dimension of 10 m.

A comparison of an object point distribution within a certain object height range can be made. This can be done in a Stixel representation in which objects are approximated in the form of rod-shaped elements extended in the vertical direction.

A comparison of object data captured and assigned in an overlap region between different camera groupings can be made within an uncertainty region around each 3D data point. The size of the uncertainty region can be specified depending on the application. A minimum number of adjacent data points within assigned object candidates or within corresponding point clouds resulting from the acquisition and assignment can also be specified depending on the application. Intra-baseline overlaps of different camera groups whose coverages overlap (inter/intra) or also a comparison between an inter-baseline detection within a camera group and an intra-baseline detection between this camera group and the adjacent camera group in the overlapping coverage can be read out. As far as no verification of an object candidate takes place during such an overlapping comparison, the object can either be discarded or considered as an existing object in the sense of a conservative, safety approach. As far as no candidate values are detected at all in a certain coverage, i.e. a camera coverage turns out to be unusually object-free, this unusually object-free region can be interpreted as an obstacle in the sense of a safety approach.

In the data processing main module 42, several, for example two, three or four point clouds, which result after detection and assignment of data processing group modules 37 to 39 of adjacent camera groups, can be checked against each other. This results in a further functionally redundant stage.

Another form-redundant stage results from two differently operating processors either at the level of the group modules or at the level of the main module.

Figure 13:
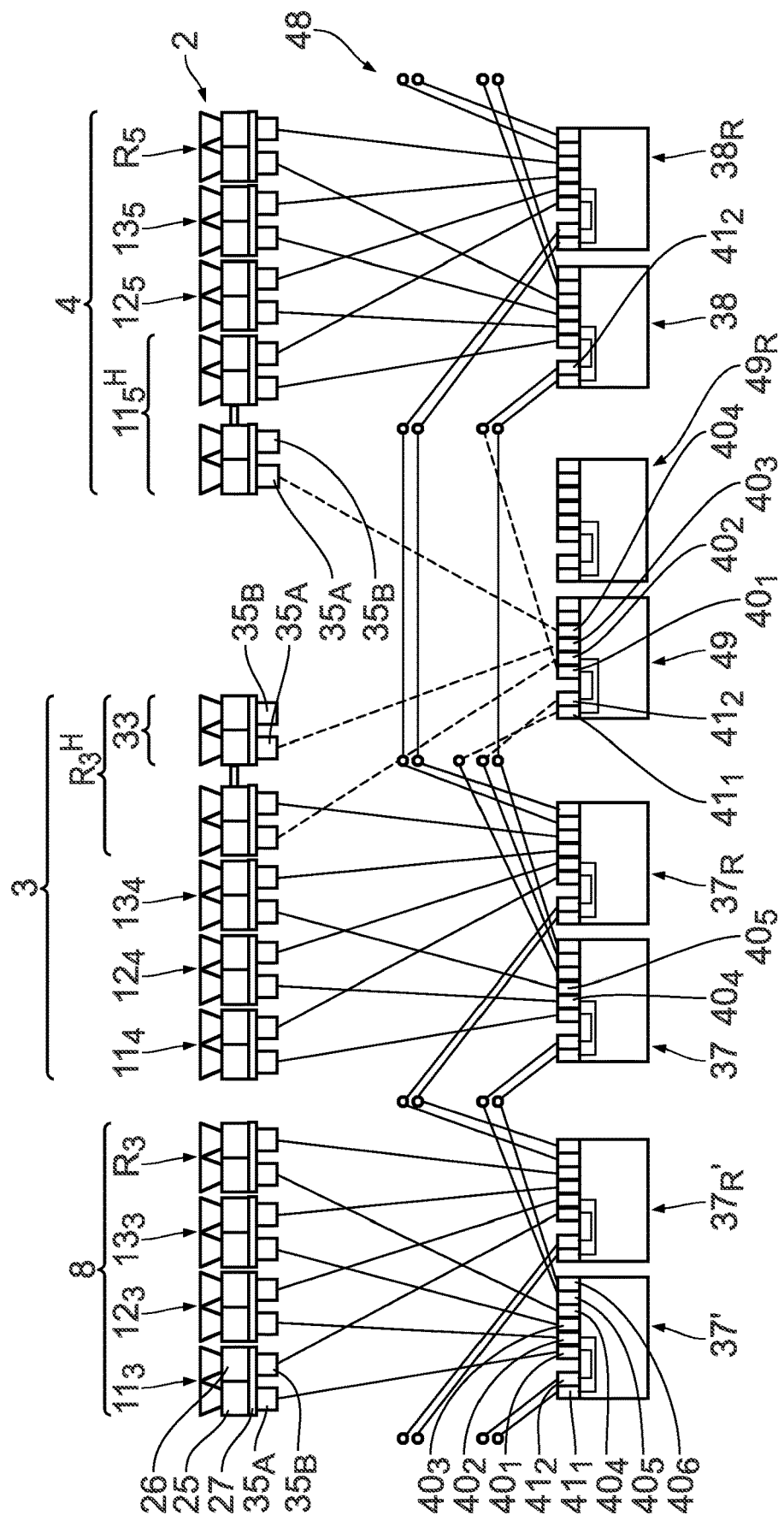
FIG. 13 in a representation similar to FIG. 12, shows an embodiment of the optical assembly, wherein in each case one camera of two of the three camera groups shown is configured as a hybrid camera according to FIG. 9, wherein an additional data processing group module is assigned to these hybrid cameras on a signal processing level of the data processing group modules.

FIG. 13 shows an alternative data processing module system 48 up to and including the level of the group modules. The main module level is thus omitted here, which is constructed according to FIG. 12.

In the data processing module system 48 according to FIG. 13, the camera groups 8 (center left, cf. FIG. 11), 3 (front left) and 4 (front right) are shown as examples. The group modules which are assigned to camera group 8 are labelled 37', $37_R$' in FIG. 13 and correspond to the group modules 37 and $37_R$ of camera group 3.

In the embodiment according to FIG. 13, the dual cameras $R_3$ and $11_4$ of camera groups 3 and 4 facing each other are replaced by hybrid cameras $R_3^H$, $11_5^H$ corresponding to the hybrid camera explained above with reference to FIG. 9.

Additional hybrid data processing group modules, namely a hybrid group module 49 and a redundancy hybrid group module $49_R$, whose structure corresponds in principle to the data processing group modules described above in connection with FIG. 12, are used to process the signal outputs $35_A$, $35_B$ of the long-range optics 33 of these hybrid cameras $R_3^H$, $11_5^H$. The signal input $40_2$ of the hybrid group module 49 is in signal connection with the signal output $35_A$ of the long-range optics 33 of the hybrid camera $R_3^H$. The signal input $40_4$ is in signal connection with the signal output $35_A$ of the long-range optics of the hybrid camera $11_5^H$. The signal input $40_1$ of the hybrid group module 49 is in signal connection with the signal output $41_2$ of the group module 38 of the camera group 4. The signal output $41_1$ of the hybrid group module 49 is in signal connection with the signal input $40_4$ of the group module 37 of camera group 3. The signal output $41_2$ of the hybrid group module 49 is in signal connection with the signal input $40_5$ of the group module 37 of camera group 3.

The wiring of the redundancy hybrid group module $49_R$ is corresponding and is not explicitly shown in FIG. 13.

This signal interconnection of the hybrid group module 49 leads to a corresponding integration of the hybrid cameras $R_3^H$ and $11_5^H$ of camera groups 3 and 4 for the acquisition and evaluation of inter- and intra-baseline camera pairs, as explained above. In this case, the acquisition data of the long-range optics 33 are additionally considered, compared and used to increase fail-safety.

In the embodiment according to FIG. 13, one redundancy camera, namely the camera $R_3^H$, is configured as a hybrid camera. Of course, this only makes sense if the redundancy camera is actually used permanently for data acquisition and evaluation and not only when one of the other cameras fails. Instead of a redundancy camera, a normal operation camera, for example one of the cameras $11_3$ to $13_3$ of camera group 3, can also be configured as a hybrid camera.

The invention claimed is:

1. An optical assembly (2) for generating a real-time image and a real-time assignment of environment objects
    having a plurality of camera groups (3 to 8), which each have at least two cameras (11 to 13) interconnected via a camera signal connection, entrance pupil centers (EPZ) of which cameras (11 to 13) define a camera arrangement plane (AE) in which the cameras (11 to 13) are arranged,
    wherein the camera groups (3 to 8) are in turn interconnected via a group signal connection (21),
    wherein adjacent image capture directions (18) of the cameras (11 to 13) of one of the camera groups (3 to 8) assume an individual camera angle (α) with respect to one another which is in the range between 5° and 25°,
    wherein a direction mean value (19) of the image capture directions (18) of the cameras (11 to 13) of one of the camera groups (3 to 8) assumes a group-camera angle (γ), with respect to a direction mean value (19) of the image capture directions (18) of the cameras (11 to 13) of an adjacent camera group (3 to 8), which is in the range between 30° and 100°.

2. The optical assembly according to claim 1, comprising three cameras (11 to 13) of one of the camera groups (3 to 8) whose individual pupil centers (EPZ) are located in corners of a non-equilateral triangle.

3. The optical assembly according to claim 1, comprising a length of a connection line (baseline, B) between the entrance pupil centers (EPZ) of two cameras (11, 12; 11, 13; 12, 13) of a camera group (3 to 8) in the range of 5 cm to 30 cm.

4. The optical assembly according to claim 1, comprising a length of a baseline ($B_{i,j}$) between cameras ($11_i$ to $13_i$, $11_j$ to $13_j$) of different camera groups (3 to 8) in the range of 0.5 m to 3 m.

5. The optical assembly according to claim 1, comprising at least three camera groups (3 to 8).

6. The optical assembly according to claim 5, comprising at least six camera groups (3 to 8).

7. The optical assembly according claim 1, comprising a group mounting body (10) for mounting the cameras (11 to 13) of a camera group (3 to 8), wherein the group mounting body (10) is configured such as to support the cameras (11 to 13) of the camera group (3 to 8) with fixed relative position and orientation to each other.

8. The optical assembly according to claim 7, wherein the group mounting body (10) has prepared holding receptacles (14, 15) for mounting additional cameras, so that the camera group (3 to 8) can be retrofitted to be extended by at least one further camera to be mounted.

9. An optical assembly (2) for generating a real-time image and a real-time assignment of environmental objects, having a plurality of cameras (11 to 13) which are linked to one another via a camera signal connection and are designed as fisheye cameras.

10. The optical assembly according to claim 1, wherein at least one of the cameras (11 to 13) is designed as a dual camera with an RGB sensor (25) and with an IR sensor (26).

11. The optical assembly according to claim 1, wherein at least one of the cameras (11 to 13) is designed as a hybrid camera with a close-range optics (32) and with a long-range optics (33).

12. The optical assembly according to claim 1, comprising a data processing module system (36; 48) comprising at least one data processing unit for processing the camera data for real-time imaging and real-time assignment of the environmental objects, wherein the data processing module system (36; 48) comprises at least one data processing group module (37, 38, 39, . . . ; $37_R$, $38_R$, $39_R$, . . . ; 37', 37, 49, 38, . . . ; $37_R'$, $37_R$, $49_R$, $38_R$, . . . ) which is assigned to precisely one of the camera groups (3 to 8) and processes the data thereof, and in each case has at least one data processing main module (42; $42_R$) which is assigned to all the camera groups (3 to 8).

13. The optical assembly according to claim 1, comprising at least one
    at least one additional redundancy camera ($R_i$; $R_3^H$) as part of one of the camera groups (3 to 8) and
    at least one redundancy data processing group module ($37_R$, $38_R$, $39_R$, . . . ; $49_R$) and
    at least one redundancy data processing main module ($42_R$).

14. A vehicle (1; 17) with the optical assembly (2) according to claim 1 comprising a chassis with ground-side chassis components (1a) which define a vehicle stand-up plane (xy) when the vehicle (1; 17) is stationary, comprising the camera groups (3 to 8) of the optical assembly (2) being mounted at a distance of at least 50 cm from the vehicle stand-up plane (xy).

15. The vehicle according to claim 14, wherein baselines (B) between the cameras (11 to 13) of a camera group (3 to 8) extend at an angle to the vehicle stand-up plane (xy) in the range between 10° and 80°.

* * * * *